March 10, 1931.  S. P. HOWE  1,795,776
AUTOMOBILE CLUTCH
Filed Dec. 15, 1928  2 Sheets-Sheet 1

WITNESS:

INVENTOR
Samuel P. Howe
BY Augustus B. Stoughton
ATTORNEY.

March 10, 1931. S. P. HOWE 1,795,776
AUTOMOBILE CLUTCH
Filed Dec. 15, 1928 2 Sheets-Sheet 2

WITNESS:
Robt R Mitchel

INVENTOR
Samuel P. Howe
BY
Augustus B. Stoughton
ATTORNEY.

Patented Mar. 10, 1931

1,795,776

UNITED STATES PATENT OFFICE

SAMUEL P. HOWE, OF PINE VALLEY, CLEMENTON, NEW JERSEY

AUTOMOBILE CLUTCH

Application filed December 15, 1928. Serial No. 326,193.

The object of this invention is a centrifugally operable clutch of the single disk, dry plate type. The invention consists in the simplicity of the mechanism, the refinements of the design, the accessibility of the various parts for assembly or disassembly of the apparatus and the efficiency and practicality of the operation of the device.

For a further understanding of the details of the invention reference may be had to the annexed drawings and specification and at the end thereof the novel features will be more especially pointed out and claimed.

Figure 2:
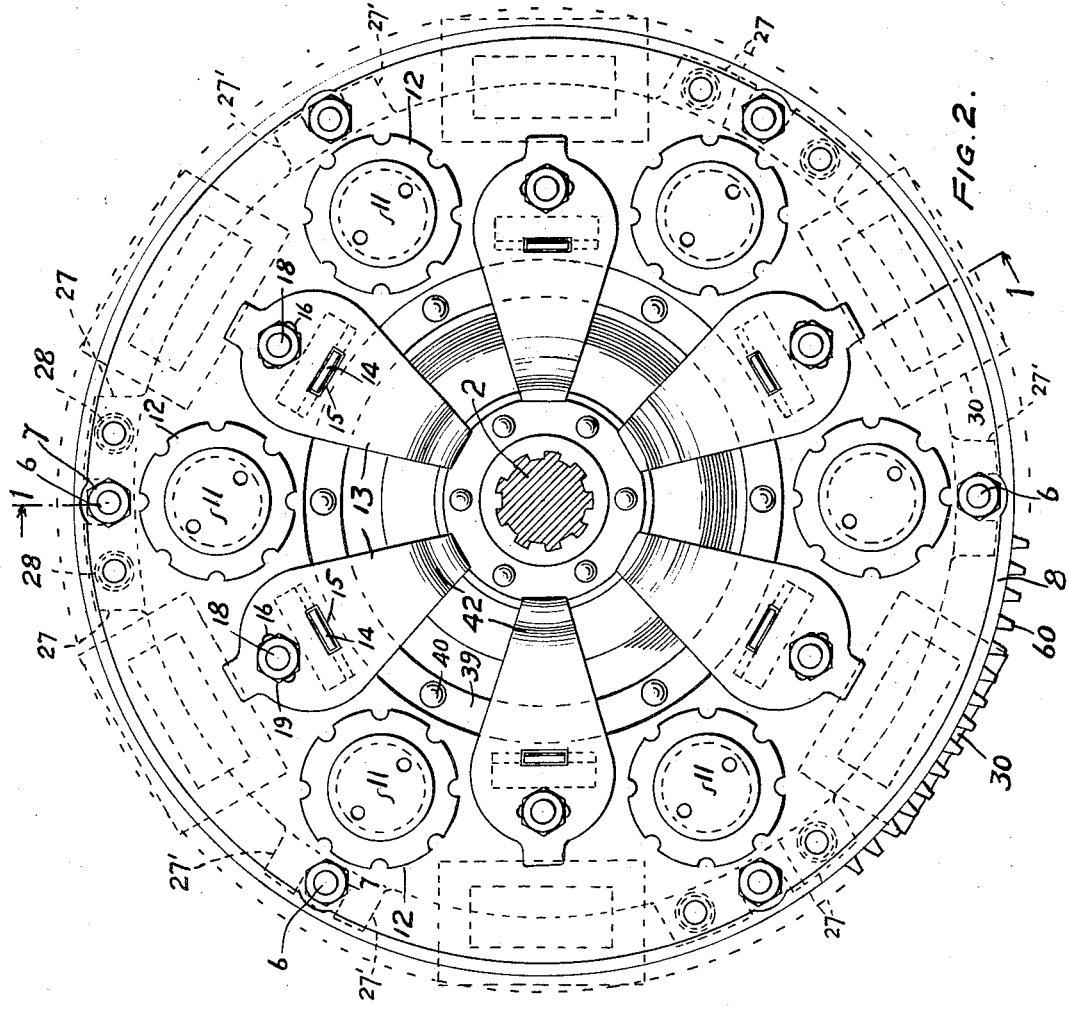
Figure 2 is a rear plan or elevation of the clutch.
Figure 1:
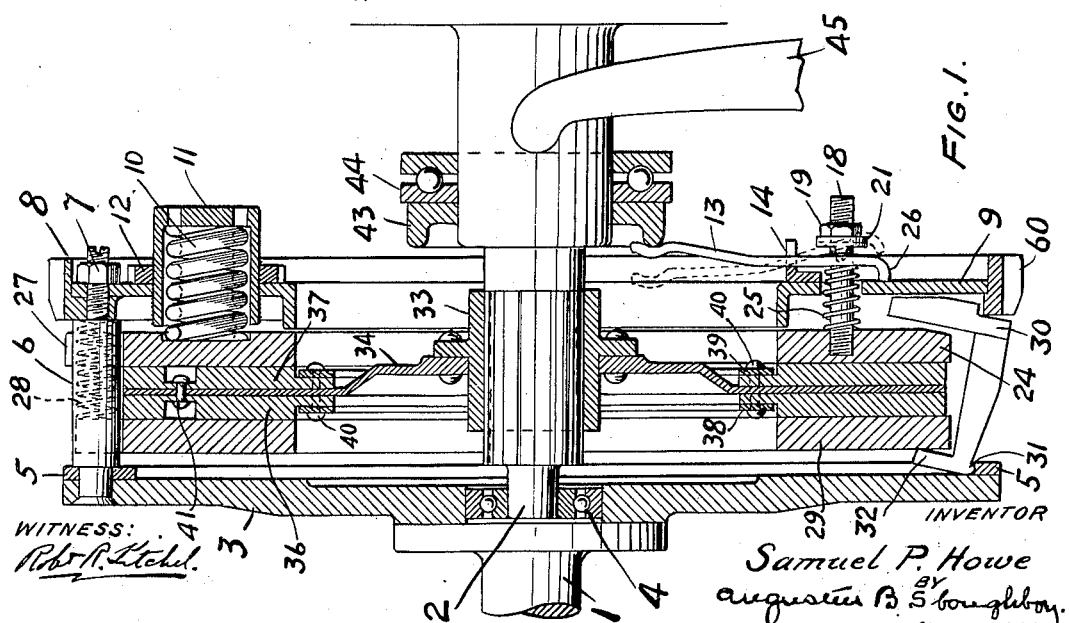
Figure 1 represents a cross-section on the line 1—1 of Figure 2.
Figure 3:
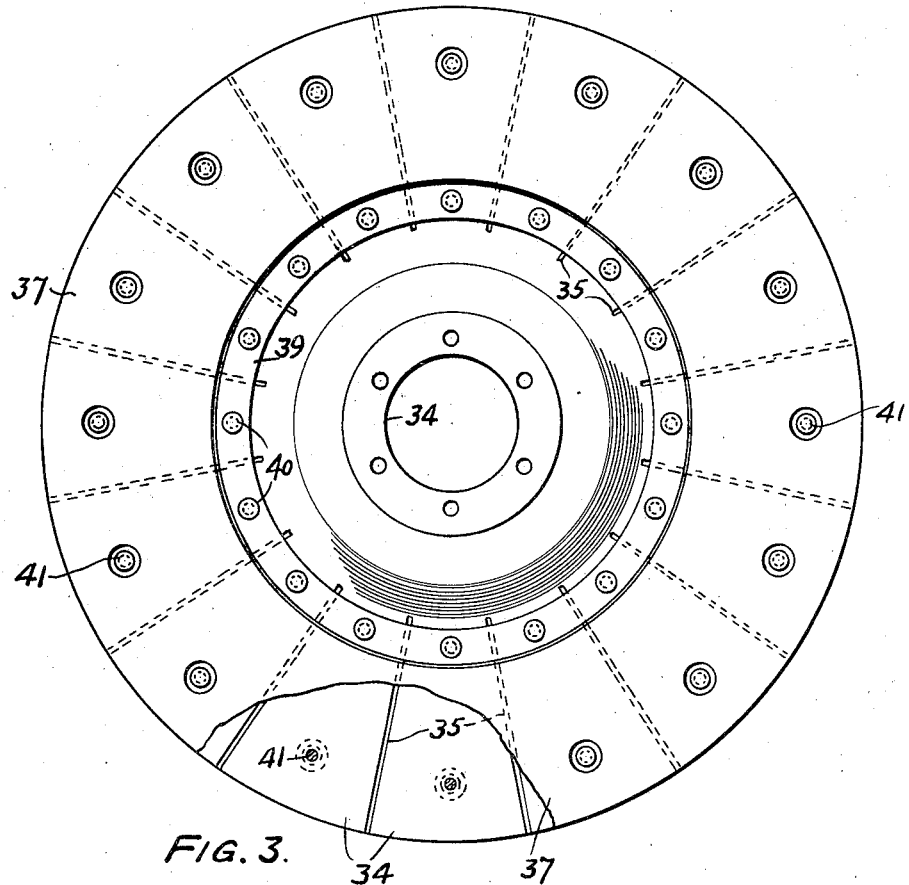
Figure 3 is an elevation of the driven disk with part of the lining broken away.
Figure 4:
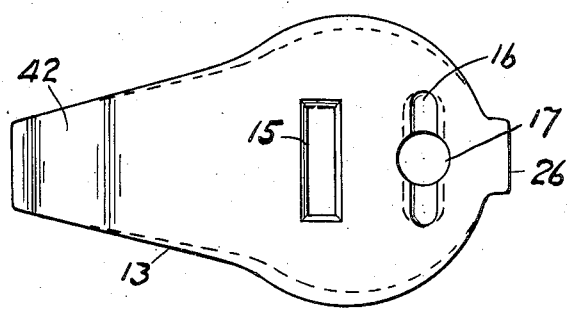
Figure 4 is a plan view of the declutching finger.
Figure 5:
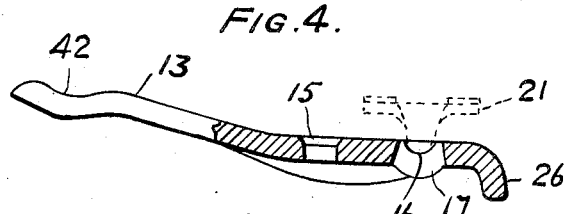
Figure 5 is a side view of the same element partially in cross-section.
Figure 6:
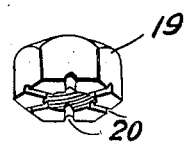
Figure 6 is an elevation of the clutch adjusting nut.
Figure 7:
Figure 7 is a similar view of the clutch rocking washer.

Referring more particularly to Figures 1 and 2, there is shown an embodiment of the invention which is particularly adapted for use in automobiles although it may be used to control any machine which is desired to be driven from a source of power. Shaft 1 is the driving shaft which is connected to a suitable source of power such as an internal combustion engine. Shaft 2 is the driven shaft which in the application to an automobile is connected to the gear box. The end of shaft 2 is received in driving plate 3 by means of bearing 4 of the ball or roller type. Fastened to the rear face of driving plate 3 is a plate 5 which is held to the driving plate by driving studs 6 and which has a series of notches in its inner edge. The rear ends of the driving studs are threaded and carry nuts 7 thereon. At the rear end of the driving studs 6 is fastened ring 8 which may have teeth on its periphery as shown at 60. Nuts 7 attach ring 8 to the driving studs 6 which pass through lugs on the inner side of ring 8.

Also attached to the rear end of studs 6 is rear housing plate 9 which is likewise fastened to the driving studs 6 by nuts 7 and which has a forwardly projecting lip at the inner edge thereof. The rear housing plate 9 carries a plurality of adjustable springs 10 which are adjustably mounted in housings 11. The housings, in turn, are screw threaded into the rear housing plate 9 and held there by lock nuts 12. Interposed between the springs 10 on the rear face of the rear housing plate 9 are declutching fingers 13 which are mounted on the rear housing plate 9 by means of tangs 14 struck up or otherwise mounted thereon.

Tangs 14 pass through notches 15 in the declutching fingers 13 which also have near the outer ends thereof notches 16 and holes 17 pass through the center of these notches. Through holes 17 pass declutching pins or studs 18 which are threaded at both ends and which should be made of a metal having a low coefficient of expansion such as invar metal. On the rear ends of these declutching studs are mounted nuts 19 having a series of radial notches 20 in their forward face. Between nuts 19 and declutching fingers 13 are mounted washers 21 having a ridge 22 extending diametrically across the rear surface and having a pair of diametrically opposite tangs 23 struck up and extending forward therefrom to form ears which ride in notches 16. Mounted at the forward ends of declutching studs 18 is rear driving disk 24. Springs 10 bear upon this driving disk in depressions hollowed out to receive them. Springs 25 which are weaker in strength than springs 10 are placed between the declutching fingers 13 and the rear driving disk 24 to hold the declutching fingers 13 close against the tangs 23. At the outer ends thereof, declutching fingers 13 have forwardly struck tangs 26. These tangs bear against the rear face of rear housing plate 9 and limit the forward motion of rear driving disk 24 due to the compression of springs 10. This is caused by declutching fingers 13 pivoting about tangs 14 and resting on tangs 26 thus forming a stop for declutching pins 18 through washers 21 and nuts 19. Rear driving disk 24 has a series of lugs 27 on the outer periphery thereof. These lugs 27 are notched to receive driving studs 6 to prevent rotation of said disk relative to the driving plate 3 but to permit sliding axial movement of disk 24.

Disk 24 also has alternate lugs 27¹ to permit the passage of springs 28 freely past it so that the springs rest on plate 29. Opposite to and in front of rear driving disk 24 is mounted a similar front driving disk 29 which is likewise carried on driving studs 6 so as to be free to move axially but to be held against rotation relative to the front driving plate 3. Plate 29 is constantly urged forward by the pressure of springs 28. The centrifugally operable weights 30 are pivoted in notched plate 5, as shown at 31, with the forward leg 32 of the weight adapted to press against the forward face of front driving disk 29 when the weight is turned about its pivot 31 due to the centrifugal force developed when shaft 1 rotates faster than a certain predetermined speed. Slidably keyed on driven shaft 2 is a collar 33. Mounted on this collar is the driven disk 34 which may be dished in the center as shown and which has a radially extending series of slots therein as indicated at 35. Mounted on both sides of the outer edge of disk 34 are driven clutch facings 36 and 37 having effective faces equal in extent to the front and rear driving disks 24 and 29, which they confront respectively. The inner edges of clutch facings 36 and 37 are reduced in thickness to receive rings 38 and 39 which serve to attach clutch facings 36 and 37 to driven disk 34 by means of rivets 40. Clutch facings 36 and 37 are additionally secured to driven disk 34 by means of rivets 41 the heads of which are received in counter bores in the operating faces of the clutch facing 36 and 37.

Declutching fingers 13 are slightly dished at their inner ends as indicated at 42 to receive the forward face of operating ring 43 which is slidably mounted upon driven shaft 2 and which is adapted to be actuated by manual actuating fingers 45 through a frictionless bearing 44.

The operation of the device is as follows:

As shown in Figure 1, shaft 1 is rotating at more than a certain predetermined speed so that weights 30 have moved outwardly about their pivots 31 so as to move the front driving disk 29 into contact with the front clutch facing 36 against the pressure of springs 28. Springs 10 tend to move the rear driving disk 29 against the rear clutch facing 37 but the forward movement of the rear driving disk 24 is limited by the declutching pins 18 which engage with the declutching fingers 13 through nuts 19 and washers 21. The amount of tension applied by springs 10 is adjustable and wear in the clutch facings 36 and 37 may be compensated for by additional adjustment of the tension in springs 10.

When the speed of rotation of shaft 1 falls below the predetermined value the weights 30 are no longer actuated by centrifugal force and, therefore, spring 28 press upon front driving disk 29 which in turn presses on arms 32 of weights 30 thereby causing the outer ends of the weights to move inward towards the axis of the clutch and to permit breaking contact between disk 29 and clutch facing 36. Since rear driving disk 24 is limited in its forward motion by the engagement of tangs 26 against rear housing plate 9, the clutch facing 37 is also disengaged from the rear driving disk 24. Complete disengagement of the clutch is therefore caused and no power is transmitted from shaft 1 to shaft 2.

When it is desired to disengage the clutch by the action of the operator of the machine, actuating fingers 45 are moved to the left, as seen in Figure 1, thereby causing operating ring 43 to press on declutching fingers 13. This operation causes the declutching fingers 13 to pivot about the tangs 14 and moves rear driving disk 24 to the rear of the clutch. This breaks contact between clutch facing 37 and rear driving disk 24 and also permits clutch facing 36 to break contact with front driving disk 29 as the front driving disk 29 is stressed into forward position by the action of springs 28. Sufficient movement of rear driving disk 24 and sufficient tension of springs 28 exists so that the clutch may be manually disengaged no matter what the speed of rotation of shaft 1.

I claim:

1. A clutch comprising, in combination, a driving member having as elements thereof a shaft, a rotary disk attached thereto, a ring shaped member having notches therein on the rear face of said disk, a series of pins riveting said ring shaped member to said disk and extending rearwardly therefrom, a rear housing member mounted on the opposite ends of said pins, a pair of driving disks comprising a front driving disk and a rear driving disk mounted on said pins so as to be held against rotation relative to said rotary disk but so as to be axially slidable upon said pins, springs compressed between said driving disks and said rear housing member, a series of weights responsive to centrifugal force developed by the rotation of said driving member and having their forward ends pivoted in notches in said ring shaped member, a plurality of pins extending rearwardly from said rear driving disk, a plurality of levers pivoted on the rear face of said rear housing member, said pins passing through said levers and means on said pins adapted to bear against said levers to limit the forward motion of said rear driving disk due to said springs, a manual operating means for said levers mounted so as to bear on the opposite ends thereof from said pins, a driven member comprising a disk interposed between said driving disks and having a facing of suitable wear resisting material equal in width to the width of said driving disks, and a shaft adapted to be driven thereby.

2. A clutch comprising, in combination, a driving member having as elements thereof a shaft, a rotary disk attached thereto, a ring shaped member having notches therein on the rear face of said disk, a series of pins riveting said ring shaped member to said disk and extending rearwardly therefrom, a rear housing member mounted on the rear ends of said pins, a pair of driving disks comprising a front driving disk and a rear driving disk mounted on said pins so as to be axially slidable upon said pins, springs interposed between said front driving disk and said rear housing member, a series of weights responsive to the centrifugal force developed by the rotation of said driving member and having their forward ends pivoted in the notches in said ring shaped member, a plurality of pins extending rearwardly from said rear driving disk, a plurality of levers pivoted on the rear face of said rear housing member, relatively weak springs surrounding said pins and interposed between said rear driving disk and said levers, relatively strong springs adjustably mounted in said rear housing member and bearing on said driving disk, said last-named pins passing through said levers and means on said pins adapted to bear against said levers to limit the forward motion of said rear driving disk due to said strong springs, a manual operating means for said levers mounted so as to bear on the opposite ends thereof from said pins, a driven member comprising a disk interposed between said driving disks and having a facing of suitable wear resisting material equal in width to the width of said driving disks, and a shaft adapted to be driven thereby.

SAMUEL P. HOWE.